United States Patent
Nazarian et al.

(10) Patent No.: US 12,159,259 B2
(45) Date of Patent: Dec. 3, 2024

(54) SYSTEMS AND METHODS FOR OBJECT REPLACEMENT

(71) Applicant: Walmart Apollo, LLC, Bentonville, AR (US)

(72) Inventors: Ehsan Nazarian, Rogers, AR (US); Behzad Nemati, Springdale, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 18/243,851

(22) Filed: Sep. 8, 2023

(65) Prior Publication Data
US 2023/0419252 A1    Dec. 28, 2023

Related U.S. Application Data

(63) Continuation of application No. 17/366,492, filed on Jul. 2, 2021, now abandoned, which is a continuation
(Continued)

(51) Int. Cl.
*G06Q 10/087*    (2023.01)
*G05D 1/00*       (2024.01)
(Continued)

(52) U.S. Cl.
CPC ......... *G06Q 10/087* (2013.01); *G05D 1/0088* (2013.01); *G05D 1/0094* (2013.01);
(Continued)

(58) Field of Classification Search
CPC .... G06Q 10/087; G06T 7/596; G05D 1/0088; G05D 1/0094; G05D 1/0246;
(Continued)

(56) References Cited

U.S. PATENT DOCUMENTS 6,341,269 B1 *   1/2002  Dulaney .......... G06Q 30/0204
                                                  705/28
8,285,584 B2 * 10/2012  Fotteler .......... G06Q 10/0631
                                                  705/28
(Continued)

OTHER PUBLICATIONS

G. Liu, W. Yu, Y. Liu; Resource Management with RFID Technology in Automatic Warehouse System, IEEE/RSJ International Conference on Intelligent Robots and Systems (2006) (Year: 2006).
(Continued)

*Primary Examiner* — Michael Jared Walker
(74) *Attorney, Agent, or Firm* — Fitch, Even, Tabin & Flannery LLP

(57) ABSTRACT

Some embodiments provide systems and methods to enable object replacement. A central computing system can receive data associated with quantities of like physical objects from remote systems. The central computing system can adjust the first quantity of the like physical objects stored in the first one of the remote systems based on the second quantity of the like physical objects stored in the at least another one of the remote systems. The central computing system can determine the like physical objects are absent from the facility. An autonomous robot device can detect a vacant space at the designated location at which the like physical objects are supposed to be disposed. The autonomous robot device using the image capturing device can capture an image of the vacant space. The central computing system can determine a set of like replacement physical objects to be disposed in the vacant space.

19 Claims, 6 Drawing Sheets

Related U.S. Application Data of application No. 16/013,469, filed on Jun. 20, 2018, now abandoned.

(60) Provisional application No. 62/522,883, filed on Jun. 21, 2017.

(51) Int. Cl.

| | |
|---|---|
| *G06T 7/593* | (2017.01) |
| *G06V 10/10* | (2022.01) |
| *G06V 20/10* | (2022.01) |
| *G06V 20/20* | (2022.01) |
| *G06V 20/52* | (2022.01) |

(52) U.S. Cl.
CPC ......... *G05D 1/0246* (2013.01); *G05D 1/0297* (2013.01); *G06T 7/596* (2017.01); *G06V 10/17* (2022.01); *G06V 20/10* (2022.01); *G06V 20/20* (2022.01); *G06V 20/52* (2022.01)

(58) Field of Classification Search
CPC ......... G05D 1/0297; G05D 2201/0216; G06K 9/00664; G06K 9/00671; G06K 9/00771; G06K 9/22

See application file for complete search history.

(56) References Cited

U.S. PATENT DOCUMENTS

| | | | | |
|---|---|---|---|---|
| 8,417,559 | B2* | 4/2013 | Joshi ................ | G06Q 30/02 |
| | | | | 705/7.29 |
| 9,205,886 | B1* | 12/2015 | Hickman ............. | G06Q 10/087 |
| 2003/0171979 | A1* | 9/2003 | Jenkins ........... | G06Q 10/06375 |
| | | | | 705/35 |
| 2003/0182176 | A1* | 9/2003 | Monnerjahn ......... | G06Q 10/04 |
| | | | | 705/7.29 |
| 2005/0114196 | A1* | 5/2005 | Schoenmeyr ......... | G06Q 10/04 |
| | | | | 705/7.29 |
| 2011/0288684 | A1* | 11/2011 | Farlow ................ | B25J 9/1697 |
| | | | | 901/1 |
| 2012/0029687 | A1* | 2/2012 | Hagen ................ | G07F 11/165 |
| | | | | 700/218 |
| 2014/0058781 | A1* | 2/2014 | Padmanabhan .... | G06Q 30/0202 |
| | | | | 705/7.22 |
| 2015/0019391 | A1* | 1/2015 | Kumar ................ | G06Q 10/087 |
| | | | | 705/28 |
| 2015/0324725 | A1* | 11/2015 | Roesbery ........... | G06Q 30/0639 |
| | | | | 705/7.39 |
| 2016/0114488 | A1* | 4/2016 | Mascorro Medina ...................... | |
| | | | | B25J 9/1697 |
| | | | | 901/1 |
| 2016/0210640 | A1* | 7/2016 | Wu ...................... | G06Q 10/087 |
| 2016/0314518 | A1* | 10/2016 | Goodwin ........... | G06Q 30/0641 |
| 2016/0371630 | A1* | 12/2016 | Jetcheva ........... | G06Q 30/0625 |
| 2017/0323253 | A1* | 11/2017 | Enssle ................ | B25J 9/1694 |
| 2018/0374036 | A1 | 12/2018 | Nazarian | |
| 2021/0334742 | A1* | 10/2021 | Nazarian ................ | G06V 10/17 |

OTHER PUBLICATIONS

International Search Report and Written Opinion from related International Patent Application No. PCT/US2018/038515 issued Aug. 31, 2018.

USPTO; U.S. Appl. No. 16/013,469; Office Action mailed Aug. 12, 2020.

USPTO; U.S. Appl. No. 16/013,469: Notice of Allowance mailed Apr. 5, 2021.

USPTO; U.S. Appl. No. 17/366,492; Notice of Allowance mailed Jun. 8, 2023 (8 pages).

USPTO; U.S. Appl. No. 17/366,492; Office Action mailed Feb. 14, 2023; (26 pages).

* cited by examiner

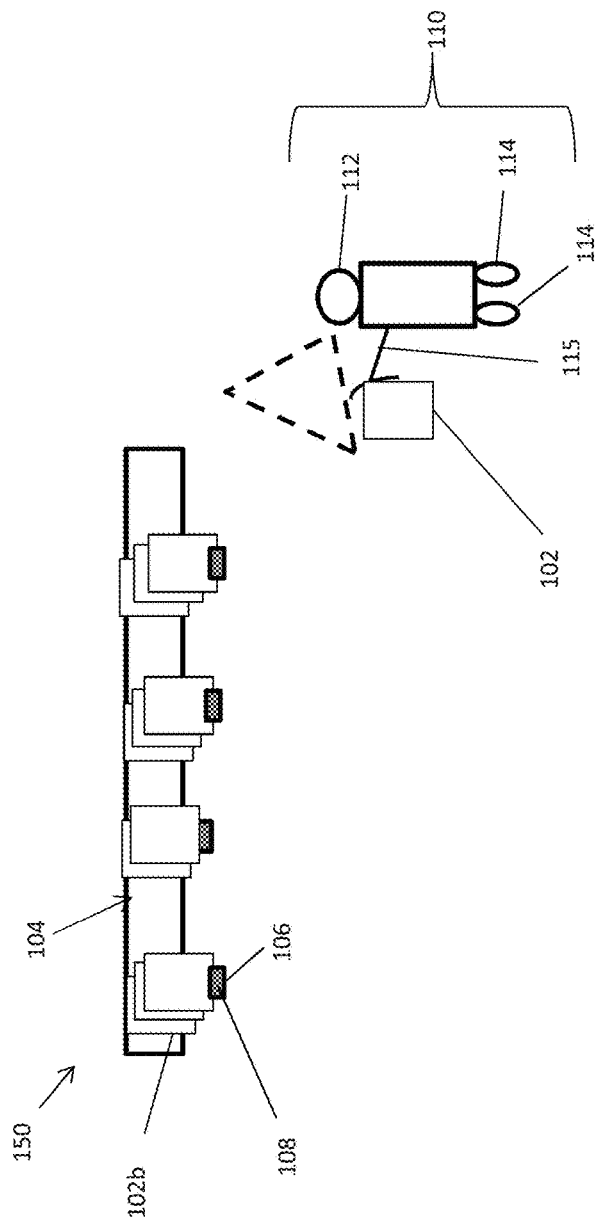

SYSTEMS AND METHODS FOR OBJECT REPLACEMENT

CROSS-REFERENCE TO RELATED PATENT APPLICATION

This application is a continuation of U.S. application Ser. No. 17/366,492 filed Jul. 2, 2021, which is a continuation of U.S. application Ser. No. 16/013,469 filed Jun. 20, 2018, which claims the benefit of U.S. Provisional Application No. 62/522,883 filed on Jun. 21, 2017, all of which are incorporated herein by reference in their entirety.

BACKGROUND

Object replacement can be a slow and error prone process causing delays in filling vacant spaces in facilities, in which physical objects are designated to be disposed.

BRIEF DESCRIPTION OF DRAWINGS

Illustrative embodiments are shown by way of example in the accompanying drawings and should not be considered as a limitation of the present disclosure. The accompanying figures, which are incorporated in and constitute a part of this specification, illustrate one or more embodiments of the disclosure and, together with the description, help to explain the inventive aspects of the present disclosure. In the figures:

FIGS. 1A-B are a block diagrams illustrating an autonomous robot device navigating in a facility according to exemplary embodiments of the present disclosure;

DETAILED DESCRIPTION

Figure 1A:
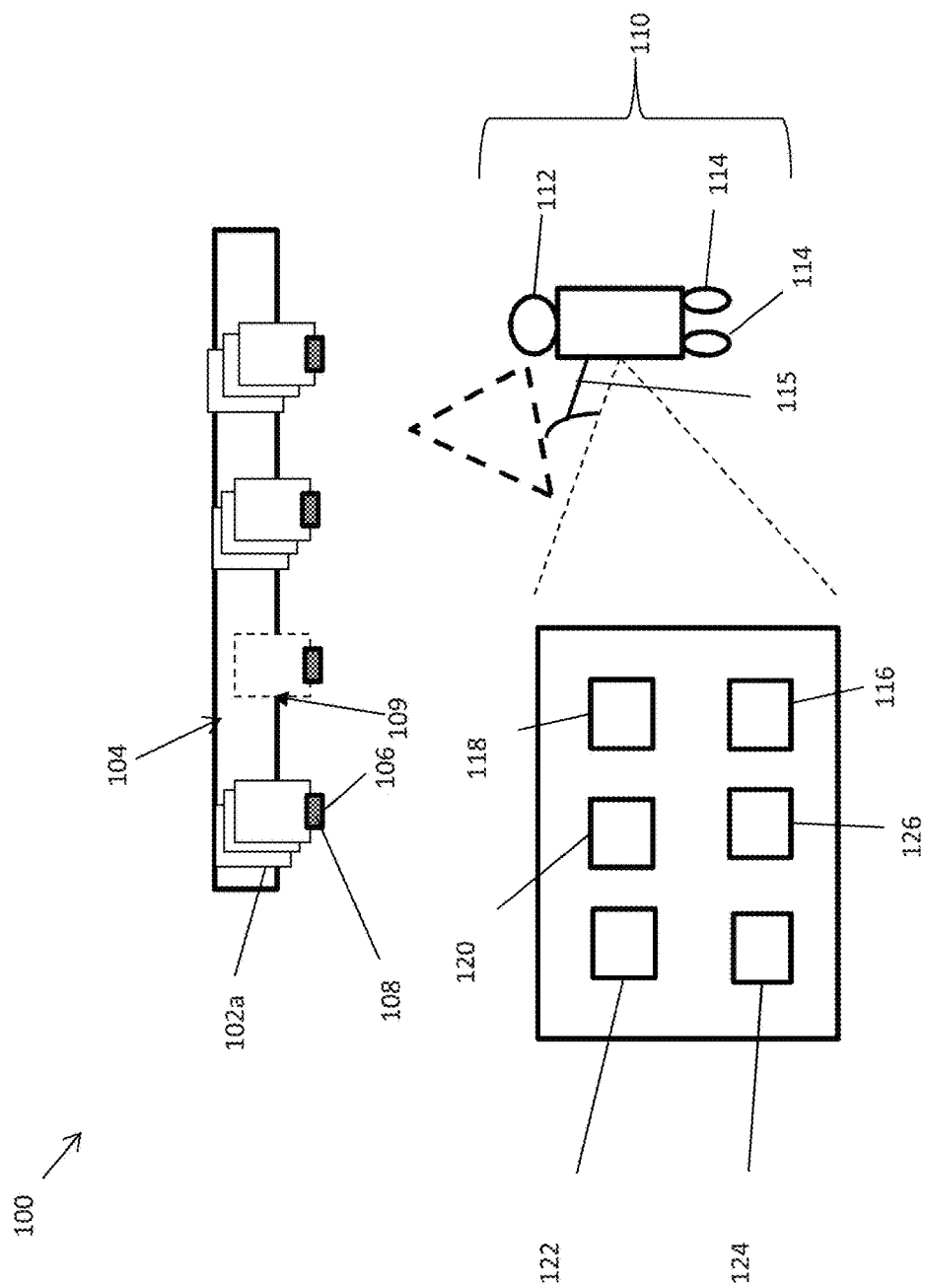

Described in detail herein are systems and methods for an object replacement system. A central computing system, which can include a data storage facility and can be operatively coupled to remote systems, can be configured to receive data associated with quantities of like physical objects from the remote systems. The central computing system can determine that data corresponding to a first quantity of the like physical objects stored in a first one of the remote systems fails to correspond to data corresponding to a second quantity of the like physical objects stored at least another one of the remote systems. The central computing system can adjust the data corresponding to the first quantity of the like physical objects stored in the first one of the remote systems based on the data corresponding to the second quantity of the like physical objects stored in the at least another one of the remote systems. The central computing system can generate an expected value for the quantity of the like physical objects at a facility associated with the first one of the remote systems, in response to the execution of the reconciliation of the plurality of quantities of the like physical objects. The central computing system can trigger, via the central computing system, an alert in response to determining the expected quantity is less than a threshold amount.

An autonomous robot device can receive the alert indicating the expected value for the quantity of the like physical objects is less than a threshold amount. The autonomous robot device can determine the designated location of the like physical objects within the facility. The autonomous robot device can autonomously navigate to the designated location of the like physical objects, and can detect, via an image capturing device, a vacant space at the designated location at which the like physical objects are supposed to be disposed. The autonomous robot device, using the image capturing device, can capture an image of the vacant space. The autonomous robot device can transmit the image to the central computing system, which can extract the physical attributes of the vacant space. The central computing system can query a database to retrieve attributes associated with the like physical objects for the designated location. The central computing system can determine a set of replacement physical objects based on the physical attributes of the vacant space and the attributes associated with the physical object that are supposed to be in the vacant space. The physical attributes of the vacant space include the shape, size and dimensions of the vacant space.

The central computing system can generate a replaceability score for each of the plurality of replacement physical objects in the set based on a calculated probability that the like physical objects are replaceable by the replacement physical objects in the set. As one example, replacement physical objects that have similar dimensions to the vacant space and/or the absent physical objects can result in a higher replaceability score. As another example, replacement physical objects having similar ingredients, functions, or uses can result in a higher replaceability score. The central computing system can rank the replacement physical objects based on the replaceability score.

The central computing system can transmit instructions to the autonomous robot device to retrieve a set of like replacement physical objects from a location in the facility based on the ranking and to deposit the set of like replacement physical objects in the vacant space at the designated location. The autonomous robot device can receive the instructions from the central computing system, can navigate to the location in the facility of the set of like replacement objects, can pick up the set of like replacement objects, and can navigate to the designated location. The autonomous robot device can deposit the set of like replacement objects in the vacant space at the designated location to fill the vacant space.

FIGS. 1A-B are a block diagrams illustrating an autonomous robot device navigating in the facility according to exemplary embodiments of the present disclosure. With reference to FIG. 1A, physical objects 102A can be disposed in a first area 100 of a facility. The physical objects 102A can be disposed on a shelving unit 104. A label 106 can be disposed below the physical objects 102A. The label 106 can include a string of alphanumeric characters and/or a machine-readable element 108 encoded with an identifier associated with the physical object disposed above the corresponding label 106.

An autonomous robot device 110 can navigate autonomously to the first area 100 of the facility. The autonomous robot device 110 can be a driverless vehicle, an unmanned aerial craft, and/or the like. The autonomous robot device 110 can include an image capturing device 112, motive assemblies 114, a picking unit 115, a controller 116, an optical scanner 118, a drive motor 120, a GPS receiver 122, accelerometer 124 and a gyroscope 126, and can be configured to roam autonomously through a facility. The picking unit 115 can be an articulated arm. The autonomous robot device 110 can be and intelligent device capable of performing tasks without human control. The controller 116 can be programmed to control an operation of the image capturing device 112, motive assemblies 114, (e.g., via the drive motor 120), in response to various inputs including inputs from the GPS receiver 122, the accelerometer 124, and the gyroscope 126. The drive motor 120 can control the operation of the motive assemblies 122 directly and/or through one or more drive trains (e.g., gear assemblies and/or belts). In this non-limiting example, the motive assemblies 122 are wheels affixed to the bottom end of the autonomous robot device 110. The motive assemblies 122 can be but are not limited to wheels, tracks, rotors, rotors with blades, and propellers. The motive assemblies 122 can facilitate 360 degree movement for the autonomous robot device 110. The image capturing device 112 can be a still image camera or a moving image camera.

The controller 116 of the autonomous robot device 110 can be configured to control the drive motor 120 to drive the motive assemblies 114 so that the autonomous robot device 110 can autonomously navigate through the facility based on inputs from the GPS receiver 122, accelerometer 124 and gyroscope 126. The GPS receiver 122 can be an L-band radio processor capable of solving the navigation equations in order to determine a position of the autonomous robot device 110, determine a velocity and precise time (PVT) by processing the signal broadcasted by GPS satellites. The accelerometer 124 and gyroscope 126 can determine the direction, orientation, position, acceleration, velocity, tilt, pitch, yaw, and roll of the autonomous robot device 110. In exemplary embodiments, the controller 116 can implement one or more algorithms, such as a Kalman filter, for determining a position of the autonomous robot device As noted above, physical objects 102A can be disposed on a shelving unit 104 in a facility. The autonomous robot device 110 can roam to the first area 100 in the facility using the motive assemblies 114 and the controller 116 can control the image capturing device 112 to capture images of the set of physical objects 102A in a designated location 109 and the respective labels 106 including the string and/or machine-readable elements 108. The autonomous robot device 110 can be programmed with a map of the facility and/or can generate a map of the facility using simultaneous localization and mapping (SLAM). The autonomous robot device 110 can navigate around the facility based on inputs from the GPS receiver 122, the accelerometer 124, and/or the gyroscope 126. The autonomous robot device 110 can be configured to capture images after an amount of time that elapses between captures, a distance traveled within the facility, continuously, and/or the like. The autonomous robot device 110 can determine from the captured image of the designated location 109 that the set of like physical objects 102A is absent from the shelving unit 104 at the designated location 109, i.e., there is a vacant space at the designated location 109. The autonomous robot device 110 can use machine vision to determine the set of like physical objects 102A is absent from the designated location 109 in the shelving unit. Machine vision can be used to provide imaging-based automatic inspection and analysis of the facility. The autonomous robot device 110 can extract the identifier from the machine-readable element 108 disposed adjacent to the vacant space, and associated with the absent set of like physical objects 102A from the captured image using machine vision. Alternatively or in addition to, the autonomous robot device 110 can extract the identifier by scanning the machine-readable element 108 using the optical scanner 118. The autonomous robot device 110 can transmit the identifier to a computing system. The autonomous robot device 110 can also transmit the captured images and/or the detected attributes associated with the absent physical objects 102A. The computing system will be discussed in greater detail with reference to FIG. 5.

With reference to FIG. 1B, replacement physical objects 102B can be disposed at a second area 150 of the facility. Similar to the physical objects 102A disposed in first area 100, the physical objects 102B can be disposed on a shelving unit 104. A label 106 can be disposed below the physical objects 104. The label 106 can include a string of alphanumeric characters and/or a machine-readable element 108 encoded with an identifier associated with the physical object disposed above the corresponding label 106.

The autonomous robot device 110 can receive instructions from the computing system to navigate to a second area 150 of the facility and pick up a set of replacement physical objects 102B to deposit in the designated location of the set of absent physical objects 102A from the first location of the facility. The instructions can include identification information associated with the replacement physical object 102B, and a quantity of the replacement physical object to be picked up by the autonomous robot device 110. The identification information can include an identifier associated with the replacement physical object 102B or other attributes (i.e. name, size, type, or color) associated with the replacement physical object 102B. The autonomous robot device 110 can navigate to the second location 150 of the facility. The autonomous robot device 110 can capture images of the physical objects 102B disposed on the shelving unit 104. The autonomous robot device 110 can extract attributes of the replacement physical object 102B from the captured images. The autonomous robot device 110 can identify the replacement physical object based on the attributes extracted from the captured images and the identification information received in the instructions. The autonomous robot device 110 can also use machine vision to identify the replacement physical object 102B. The autonomous robot device 110 can extract the identifier from the machine-readable element 108 associated with the absent set of like replacement physical object 102B from the captured image using machine vision. Alternatively or in addition to, the autonomous robot device 110 can extract the identifier by scanning the machine-readable element 108 using the optical scanner 118. In response to confirming the replacement physical object 102B is present on the shelving unit 104, the autonomous robot device 110 can pick up a set of replacement physical objects 102B, using the picking unit 115. The autonomous robot device 110 can carry the set of replacement physical objects 102 and navigate to the first area 100. The autonomous robot device 110 can deposit the set of replacement physical objects 102B in the designated location (e.g. designated area 109 as shown in FIG. 1A) of the absent physical objects 102A.

Figure 2:
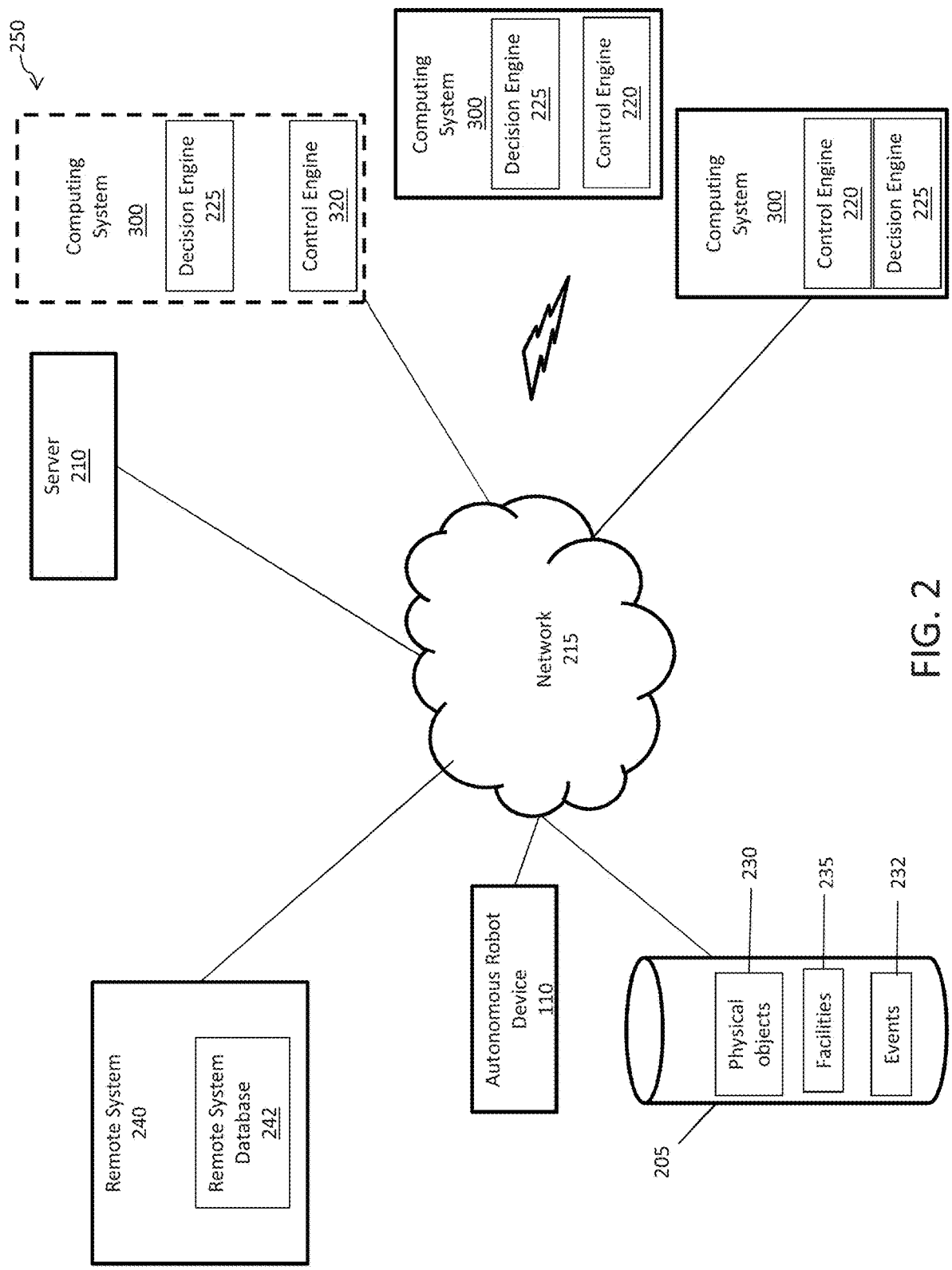
FIG. 2 illustrates a network diagram of an object replacement system in accordance with an exemplary embodiment.

FIG. 2 illustrates a network diagram of an object replacement system in accordance with an exemplary embodiment. The object replacement system 250 can include one or more databases 205, one or more central computing systems 200, one or more autonomous robotic devices 110, and one or more remote systems 240 communicating over communication network 215. The remote systems 240 can include a remote system database 242. The central computing system 200 can execute one or more instances of a control engine 220 and a decision engine 225. The control engine 220 and decision engine 225 can be an executable application residing on the computing system 200 to implement the object replacement system 250 as described herein.

In an example embodiment, one or more portions of the communications network 215 can be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

The central computing system 200 includes one or more computers or processors configured to communicate with the databases 205, autonomous robotic devices 110 and remote systems 240, via the network 215. The computing system 200 hosts one or more applications configured to interact with one or more components of the object replacement system 250. The databases 305 may store information/data, as described herein. For example, the databases 205 can include an events data storage facility 230, a physical objects database 230, and a facilities database 235. The events data storage facility 230 can store information associated with events. The physical objects database 230 can store information associated with physical objects. The facilities database 235 can store information associated with facilities. The databases 205 can be located at one or more geographically distributed locations from the central computing system 200. Alternatively, the databases 205 can be included within the computing system 200.

In one embodiment, multiple remote systems 240 can be in communication with a decision engine 225 residing on a central computing system. Each of the remote systems 240 can be in communication with a remote system database 242 and the decision engine 225 can be in communication with an event data storage facility 232. Each of the remote systems databases 242 can store data associated with the respective remote system 240. Various events can occur in different facilities. The events can include actions occurring at one or more remote systems 240. The action can be database actions, associated with data of physical objects disposed at the facility. The action can be executed by the one or more remote systems on the remote system databases 242 of the respective one or more remote systems 240. The events can be transmitted from the one or more remote systems 240 to the central computing system 200.

The central computing system 200 can execute the decision engine 225 in response to receiving the events which occur at remote systems 240. The decision engine 225 can store the received events in the event data storage facility 230. The decision engine 225 can determine whether the actions that occurred at the one more remote systems 240 from which the events were transmitted, prompt any actions which need to be taken on data associated with other remote systems 240. In response to determining actions which need to be taken on data associated with the other remote systems 240, the decision engine 225 can transmit instructions to each of the other remote systems 240 to execute actions on the data stored in the respective databases, based on the actions associated with data which have taken place at the one or more remote systems 240 which transmitted the events. The other remote systems 240 can execute the actions based on the received instructions. The actions can be deleting data, inserting data, merging date, and/or any other database related action. For example, the actions can be adjusting quantities of physical objects disposed at facilities at remote system databases 242 which store data associated with the respective physical objects.

The central computing system 200 can determine a quantity of a set of like physical objects designated to be disposed at a facility is absent from the facility, based on the adjustment of data corresponding to the quantities of physical objects at remote system databases 242. The central computing system 200 can execute the control engine 220 in response to determining the quantity of the set of like physical objects designated to be disposed at a facility is absent from the facility. The control engine 220 can query the physical objects database 230 to retrieve identification information of the physical object along with the designated location of the set of like physical objects in the facility. The control engine 220 can instruct an autonomous robotic device 110 disposed in the facility to verify the set of like physical objects are absent from the facility. The instructions can include the identification information of the set of like physical objects and the location of the set of like physical objects in the facility.

The autonomous robot device 110 can navigate to the designated location of the set of like physical objects in the facility. The controller 116 can control the image capturing device 112 to capture images of the designated location of the set of like physical objects and the respective labels including the string and/or machine-readable elements. The autonomous robot device 110 can determine from the captured image that the set of like physical objects 102 is absent from the designated location. The autonomous robot device 110 can use machine vision to determine the set of like physical objects is absent from the designated location. Machine vision can be used to provide imaging-based automatic inspection and analysis of the facility. The autonomous robot device 110 can extract the identifier from the machine-readable element disposed adjacent to the designated location, and associated with the absent set of like physical objects from the captured image using machine vision. Alternatively, or in addition, the autonomous robot device can extract the identifier by scanning the machine-readable element using the optical scanner 118. The autonomous robot device 110 can transmit a verification that the set of like physical objects are absent from the designated location. In some embodiments, the autonomous robot device 110 can also transmit the captured images and/or the detected attributes associated with the designated location of the absent set of like physical objects to the central computing system 200. The attributes can include size, dimensions and proximity to other physical objects.

The control engine 220 can receive the verification of the set of like physical objects are absent from the designated location. The control engine 220 can also receive the captured images and/or detected attributes of the designated location of the set of like physical objects. In the event the control engine 220 receives images of the designated location, the control engine 220 can extract attributes from the captured images of the designated location. The attributes can include size, dimensions and proximity to other physical objects. The control engine 220 can query the physical objects database 230 to retrieve information associated with the absent set of like physical objects. The information can include, name, type, size, dimensions, color and other information associated with a physical objects. The control engine 220 can also query the facilities database 235 to determine rules associated with physical objects disposed in the facility. The control engine 220 can determine a replacement physical object based on the information associated with the absent set of like physical objects, the attributes associated with the designated location, and the rules of the facility associated with physical objects disposed in the facility. The control engine 220 can query the physical objects database 230 to determine a quantity of the replacement physical object disposed at the facility, the identification information of the replacement physical object, and location of replacement physical object disposed at the facility. In response to determining the quantity of the replacement physical object is greater than a threshold amount, the control engine 220 can instruct the autonomous robotic device to retrieve a specified a quantity of the replacement physical object from the location of the replacement physical object in the facility, and deposit the specified quantity of replacement physical object at the designed location of the absent set of like physical objects.

In some embodiments, the control engine 220 can determine a group of replacement physical objects. The control engine 220 can generate a replaceability score for each of the group of replacement objects based on the similarity to the absent set of physical objects, the attributes associated with the designated location and the rules of the facility associated with physical objects disposed in the facility. The control engine 220 can rank each of the replacement physical objects based on score. The control engine 220 can select a replacement physical object from the group of replacement physical objects based on rank and quantity of replacement physical objects disposed in the facility.

The autonomous robotic device 110 can receive the instructions from the control engine 220. The instructions can include identification information associated with the replacement physical object, and a quantity of the replacement physical object to be picked up by the autonomous robot device 110. The identification information can include an identifier associated with the replacement physical object or other attributes (i.e. name, size, type, or color) associated with the replacement physical object. The autonomous robot device 110 can navigate to the location of the facility where the replacement object is disposed. The autonomous robot device 110 can capture images of the physical objects at the location where the replacement physical object is disposed. The autonomous robot device 110 can extract attributes of the replacement physical object from the captured images. The autonomous robot device 110 can identify the replacement physical object based on the attributes extracted from the captured images and the identification information received in the instructions. The autonomous robot device 110 can also use machine vision to identify the replacement physical object. In response to confirming the replacement physical object is present, the autonomous robot device 110 can pick up a set of replacement physical objects, based on the quantity received in the instructions. The autonomous robot device 110 can carry the set of replacement physical objects and navigate to the designated location of the absent set of like physical objects. The autonomous robot device 110 can deposit the set of replacement physical objects in the designated location of the absent physical objects.

As a non-limiting example, the object replacement system 350 can be implemented in a retail store and/or e-commerce environment. The remote systems 240 can be associated with one or more retail store or e-commerce website. Each of the remote systems 240 can be associated with a remote system database 242 and each of the aforementioned remote systems 240 can generate events. For example, a Sales/Returns remote system 240 can generate an event of a sale of a product. Data associated with the sale of the product can be committed to the remote system database 242 associated with the Sales/Returns remote system 240.

The event can be transmitted from the Sales/Returns remote system 240 can transmitted to the central computing system 240. The event can include data associated with the sale of the product including the identification of the product and the quantity of the product that has been sold. The decision engine 225 can determine the remote systems 240 affected by the sale of product. The decision engine 240 can determine the Inventory Adjustment remote system 240 is affected by the sale of the product as the inventory of the product should be decreased by the quantity of product sold based on the received event. Furthermore, the decision engine 225 can also determine based on an adjustment to the inventory of the product, the quantity of the product disposed in the retail store is less than a threshold amount and a purchase order needs to be generated for more of the product for the facility. Accordingly, the decision engine 225 can determine the PO Create/Update remote system 240 is also affected by the event of the sale of the product. The decision engine 225 can transmit instructions to the Inventory Adjustment remote system 240 can the PO create/update remote system 240 to update the respective remote system databases 242. The Inventory Adjustment remote system 240 can adjust the inventory of the sold product in the remote system database 242 associated with the Inventory Adjustment remote system 240, in response to receiving instructions from the decision engine 225. The PO create/update remote system 240 can generate and store a new purchase order in the remote system database 242 associated with the PO create/update remote system 240, in response to receiving instructions from the decision engine 225. The updated data can trigger a change in a sales forecast and demand forecast associated with the product.

The control engine 220 can determine the product like the sold product is now absent from the facility based on the Inventory Adjustment remote system 240 adjusting the inventory of the product in the remote system database 242. The control engine 220 can query the physical objects database 230 to retrieve identification information of the product along with the designated location of the product in the retail store. The control engine 220 can instruct an autonomous robotic device 110 disposed in the facility to verify product is now absent from the retail store.

The autonomous robot device 110 can navigate to the designated location of the set of the product. The autonomous robot device 110 can determine from the captured image that the set of like physical objects 102 is absent from the designated location. The autonomous robot device 110 can transmit a verification that the product is absent from the designated location. In some embodiments, the autonomous robot device 110 can also transmit the captured images and/or the detected attributes associated with the designated location of the absent product to the central computing system 200. The attributes can include, size, dimensions, proximity to other physical objects, demand forecast, sales forecast and vendor pack size rules.

The control engine 220 can receive the verification of the product are absent from the designated location. The control engine 220 can also receive the captured images and/or detected attributes of the designated location of the product. In the event the control engine 220 receives images of the designated location, the control engine 220 can extract attributes from the captured images of the designated location. The control engine 220 can query the physical objects database 330 to retrieve information associated with the absent the product. The information can include, name, type, size, dimensions, color and other information associated with the product. The control engine 220 can also query the facilities database 235 to determine rules associated with the products disposed in the retail store. For example, the rules can control the display of age-restricted products such as alcohol and cigarettes. The control engine 220 can determine a replacement product based on the information associated with the absent product, the attributes associated with the designated location, and the rules of the facility associated with physical objects disposed in the facility. For example, in the event the absent product is a 12-Pack of Coca-Cola, the control engine 220 can determine 2 6-Packs of Pepsi can be a replacement product, as 2 6-Packs of Pepsi are similar product to 12-Pack of Coca-Cola, and the same size, shape and dimensions as 12-pack of Coca-Cola. The control engine 220 can query the physical objects database 230 to determine a quantity of the replacement product disposed at the facility, the identification information of the replacement product, and location of replacement product disposed at the retail store. In response to determining the quantity of the replacement product is greater than a threshold amount, the control engine 220 can instruct the autonomous robotic device to retrieve a specified a quantity of the replacement product from the location of the replacement product in the retail store, and deposit the specified quantity of replacement product at the designed location of the absent product.

The autonomous robotic device 110 can receive the instructions from the control engine 220. The instructions can include identification information associated with the replacement product, location of the replacement product in the retail store and a quantity of the replacement product to be picked up by the autonomous robot device 110. The identification information can include an identifier associated with the replacement product or other attributes (i.e. name, size, type, or color) associated with the replacement product. The autonomous robot device 110 can navigate to the location of the retail store where the replacement product is disposed. In response to confirming the replacement product is present, the autonomous robot device 110 can pick up a set of replacement products, based on the quantity received in the instructions. The autonomous robot device 110 can carry the set of replacement products and navigate to the designated location of the absent product. The autonomous robot device 110 can deposit the set of replacement products in the designated location of the absent product.

Figure 3:
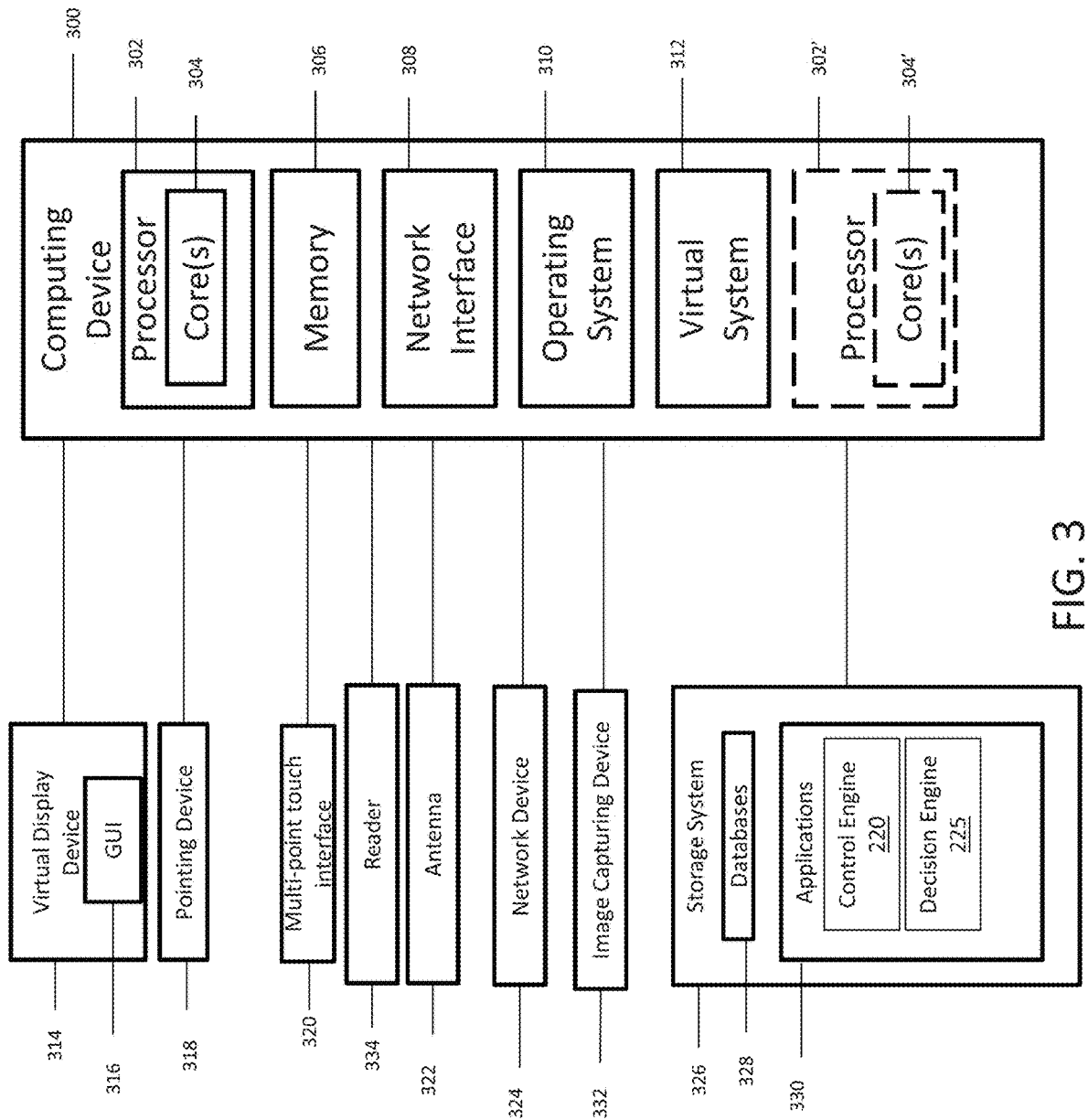
FIG. 3 illustrates a block diagram an exemplary computing device in accordance with an exemplary embodiment.

FIG. 3 is a block diagram of an exemplary computing device suitable for implementing embodiments of the object replacement system. The computing device may be, but is not limited to, a smartphone, laptop, tablet, desktop computer, server or network appliance. The computing device 300 can be embodied as the central computing system, remote system, and/or autonomous robot device. The computing device 300 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives, one or more solid state disks), and the like. For example, memory 306 included in the computing device 300 may store computer-readable and computer-executable instructions or software (e.g., applications 330 such as the decision engine 225 and the control engine 220) for implementing exemplary operations of the computing device 300. The computing device 300 also includes configurable and/or programmable processor 302 and associated core(s) 304, and optionally, one or more additional configurable and/or programmable processor(s) 302' and associated core(s) 304' (for example, in the case of computer systems having multiple processors/cores), for executing computer-readable and computer-executable instructions or software stored in the memory 306 and other programs for implementing exemplary embodiments of the present disclosure. Processor 302 and processor(s) 302' may each be a single core processor or multiple core (304 and 304') processor. Either or both of processor 302 and processor(s) 302' may be configured to execute one or more of the instructions described in connection with computing device 300.

Virtualization may be employed in the computing device 300 so that infrastructure and resources in the computing device 300 may be shared dynamically. A virtual machine 312 may be provided to handle a process running on multiple processors so that the process appears to be using only one computing resource rather than multiple computing resources. Multiple virtual machines may also be used with one processor.

Memory 306 may include a computer system memory or random access memory, such as DRAM, SRAM, EDO RAM, and the like. Memory 306 may include other types of memory as well, or combinations thereof. The computing device 300 can receive data from input/output devices such as, a reader 334 and an image capturing device 332.

A user may interact with the computing device 300 through a visual display device 314, such as a computer monitor, which may display one or more graphical user interfaces 316, multi touch interface 320 and a pointing device 318.

The computing device 300 may also include one or more storage devices 326, such as a hard-drive, CD-ROM, or other computer readable media, for storing data and computer-readable instructions and/or software that implement exemplary embodiments of the present disclosure (e.g., applications such as the decision engine 225 and the control engine 220). For example, exemplary storage device 326 can include one or more databases 328 for storing information regarding the physical objects, facilities and events. The databases 328 may be updated manually or automatically at any suitable time to add, delete, and/or update one or more data items in the databases.

The computing device 300 can include a network interface 308 configured to interface via one or more network devices 324 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. In exemplary embodiments, the computing system can include one or more antennas 322 to facilitate wireless communication (e.g., via the network interface) between the computing device 300 and a network and/or between the computing device 300 and other computing devices. The network interface 308 may include a built-in network adapter, network interface card, PCMCIA network card, card bus network adapter, wireless network adapter, USB network adapter, modem or any other device suitable for interfacing the computing device 300 to any type of network capable of communication and performing the operations described herein.

The computing device 300 may run any operating system 310, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device 300 and performing the operations described herein. In exemplary embodiments, the operating system 310 may be run in native mode or emulated mode. In an exemplary embodiment, the operating system 310 may be run on one or more cloud machine instances.

Figure 4:
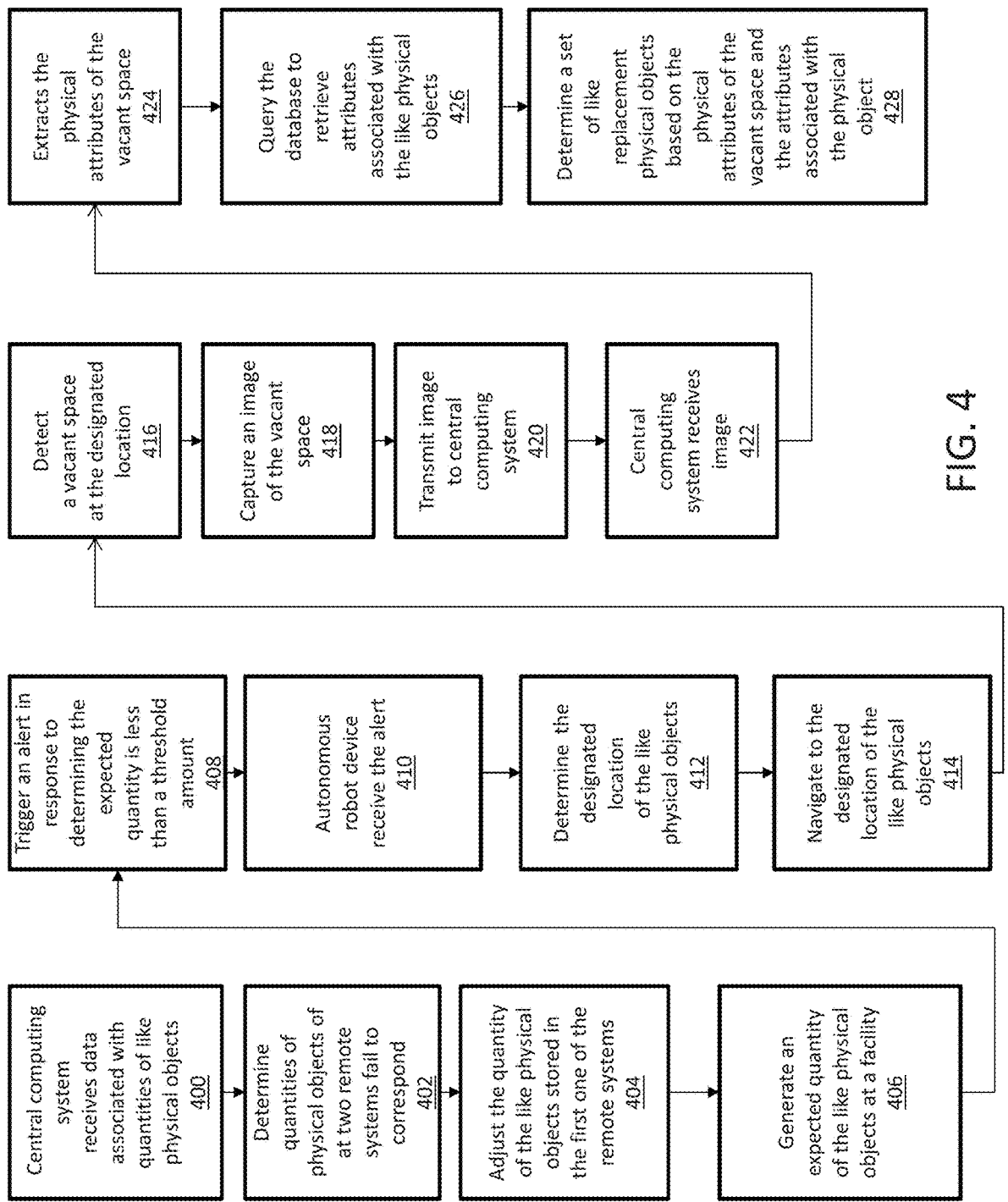
FIG. 4 is a flowchart illustrating a process implemented by the object replacement system according to an exemplary embodiment.

FIG. 4 is a flowchart illustrating a process implemented by an object replacement system according to an exemplary embodiment. In operation 400, a central computing system (e.g. central computing system 200 as shown in FIG. 2) including a data storage facility (e.g. events data storage facility 232 as shown in FIGS. 2-3 and physical objects database 330 and facilities database 235 as shown in FIG. 3) and operatively coupled to remote systems (e.g. remote systems 240 as shown in FIGS. 2-3), receives data associated with quantities of like physical objects (physical objects 102A-B as shown in FIGS. 1A-B) from the remote systems. In operation 402, the central computing system can determine a first quantity of the like physical objects stored in a first one of the remote systems fails to correspond to a second quantity of the like physical objects stored at least another one of the remote systems. In operation 504, the central computing system can adjust data corresponding to the first quantity of the like physical objects stored in the first one of the remote systems based on data corresponding to the second quantity of the like physical objects stored in the at least another one of the remote systems. In operation 406, the central computing system can generate an expected quantity of the like physical objects at a facility associated with the first one of the remote systems, in response to the execution of the reconciliation of the plurality of quantities of the like physical objects. In operation 408, the central computing system can trigger an alert in response to determining the expected quantity is less than a threshold amount.

In operation 410, an autonomous robot device (e.g. autonomous robot device 110 as shown in FIGS. 1A-B and 3) can receive the alert indicating the expected quantity of the like physical objects is less than a threshold amount. The autonomous robot device can include an image capturing device (e.g. image capturing device 112 as shown in FIGS. 1A and 3) In operation 412, the autonomous robot device can determine the designated location (e.g. designated location 109 as shown in FIG. 1A) of the like physical objects within the facility. In operation 414, the autonomous robot device can autonomously navigate to the designated location of the like physical objects. In operation 416, the autonomous robot device can detect via the image capturing device, a vacant space at the designated location at the designated location at which the like physical objects are supposed to be disposed. In operation 418 the autonomous robot device using the image capturing device can capture an image of the vacant space. In operation 420, the autonomous robot device can transmit the image to the central computing system. In operation 422, the central computing system can receive the image. In operation 424 the central computing system can extract the physical attributes of the vacant space. In operation 426, the central computing system can query the database to retrieve attributes associated with the like physical objects. In operation 428, the central computing system can determine a set of like replacement physical objects based on the physical attributes of the vacant space and the attributes associated with the physical object.

Figure 5:
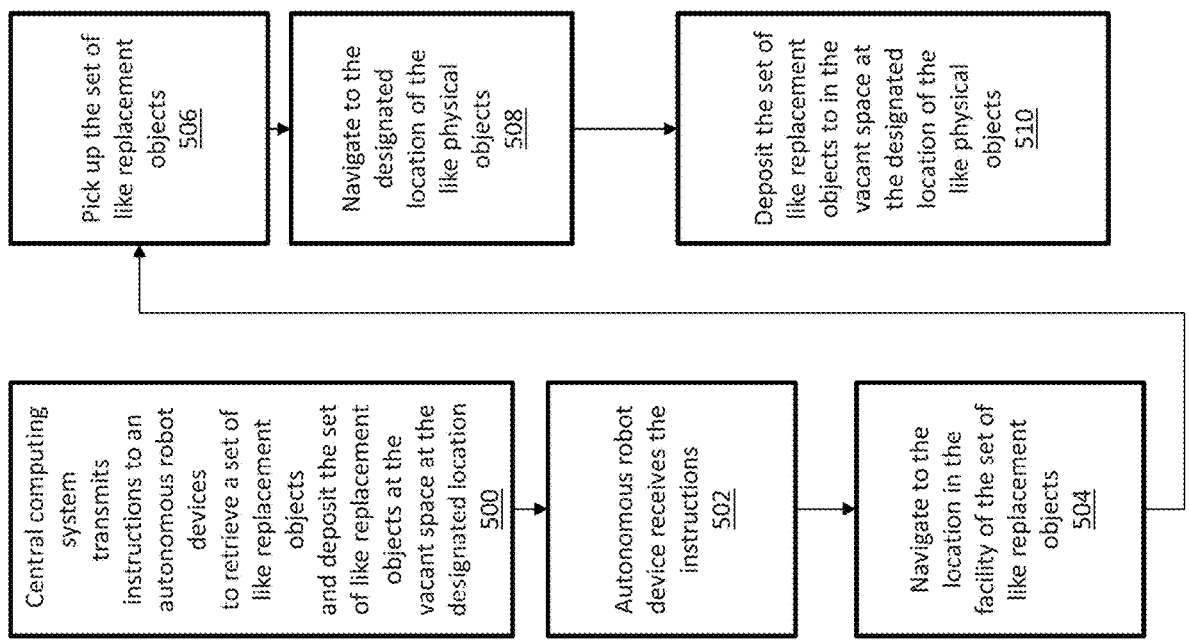
FIG. 5 is a flowchart illustrating a process implemented by the object replacement system according to an exemplary embodiment.

FIG. 5 is a flowchart illustrating a process implemented by an object replacement system according to an exemplary embodiment. In operation 500, a central computing system (e.g. central computing system 200 as shown in FIG. 3) can transmit instructions to an autonomous robot devices (e.g. autonomous robot device 110 as shown in FIGS. 1A-1B and 3) to retrieve a set of like replacement objects (e.g. physical objects 102 as shown in FIG. 1A-1B) from a location (e.g. second location 150 as shown in FIG. 1B) in the facility and deposit the set of like replacement objects at the vacant space at the designated location (e.g. first location 100 as shown in FIG. 1A) of like physical objects. In operation 502, the autonomous robot device can receive the instructions from the central computing system. In operation 504, the autonomous robot device can navigate to the location in the facility of the set of like replacement objects. In operation 506, the autonomous robot device can pick up the set of like replacement objects. In operation 508, the autonomous robot device can navigate to the designated location of the like physical objects. In operation 510, the autonomous robot device can deposit the set of like replacement objects to in the vacant space at the designated location of the like physical objects.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a multiple system elements, device components or method steps, those elements, components or steps may be replaced with a single element, component or step. Likewise, a single element, component or step may be replaced with multiple elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the present disclosure. Further still, other aspects, functions and advantages are also within the scope of the present disclosure.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

The invention claimed is:

1. An object replacement system, the system comprising:
a central computing system operatively coupled to a plurality of remote systems, the central computing system configured to:
receive data associated with a plurality of quantities of like physical objects from the plurality of remote systems;
generate an expected quantity value of the like physical objects at a facility associated with a first one of the plurality of remote systems;
determine that the expected quantity value of the like physical objects at the facility is less than a threshold amount;
communicate first instructions, in response to the determination that the expected quantity value of the like physical objects at the facility is less than a threshold amount, controlling at least a first image capturing device at the facility to capture an image of a vacant space at a designated location at which the like physical objects are supposed to be disposed;
receive the image and extract physical attributes of the vacant space based on the image;
query a database to retrieve attributes associated with the like physical objects;
determine a set of like replacement physical objects, based on the physical attributes of the vacant space and the attributes associated with the like physical objects, to be placed into the vacant space; and
transmit second instructions controlling depositing at least some of the set of like replacement physical objects in the vacant space at the designated location of the like physical objects, wherein the transmitting the second instructions comprises transmitting at least a robot instruction to at least one autonomous robot device of a plurality of autonomous robot devices disposed in the facility, wherein the plurality of autonomous robot devices are in selective communication with the central computing system.

2. The system of claim 1, wherein the transmitting the second instructions comprises transmitting a first set of one or more instructions, comprising the robot instruction, controlling the at least one autonomous robot device to retrieve at least a first like replacement object of the set of like replacement physical objects, and deposition the first like replacement object in the vacant space at the designated location.

3. The system of claim 1, further comprising:
a plurality of image capturing devices disposed in the facility, wherein the plurality of image capturing devices comprises the first image capturing device, wherein the central computing system is configured to control activation of at least the first image capturing device proximate the designated location to capture the image of the vacant space at the designated location.

4. The system of claim 1, wherein the central computing system is further configured to:
determine a quantity of the like physical objects designated to be disposed at the designated location and that are expected absent from the facility based on data corresponding to quantities of physical objects associated with the first one of the plurality of remote systems; and
retrieve, from a physical objects database, identification information of the like physical objects, and the designated location of the like physical objects in the facility.

5. The system of claim 4, wherein the central computing system is configured to access rules associated with the designated location and physical objects disposed in the facility associated with the first one of the plurality of remote systems, and wherein the central computing system in determining the set of like replacement physical objects is configured to determine the set of like replacement physical objects based on the physical attributes of the vacant space, the attributes associated with the like physical objects to be placed in to the vacant space, and the rules.

6. The system of claim 1, wherein the central computing system is configured to rank each different like replacement physical objects of a plurality of different like replacement physical objects, and select the set of like replacement physical objects from the plurality of different like replacement physical objects to be placed into the vacant space.

7. The system of claim 1, wherein the central computing system is configured to generate a replaceability score for each of the like replacement physical objects of the set of like replacement physical objects based on a calculated probability that the like physical objects are replaceable by a respective like replacement physical object of the set of like replacement physical objects, based on the physical attributes of the vacant space and the attributes associated with the like physical objects.

8. The system of claim 7, wherein the central computing system is configured to rank each of the respective like replacement physical objects of the set of like replacement physical objects based on the replaceability score for each of the respective like replacement physical objects of the set of like replacement physical objects.

9. The system of claim 1, wherein the central computing system is configured to access remote databases each associated with a respective one of the plurality of remote systems to retrieve a respective quantity data identifying a designated quantity of the like physical objects associated with the respective one of the plurality of remote systems.

10. An object replacement system, the system comprising:
a central computing system operatively coupled to a plurality of remote systems, the central computing system configured to:
receive data associated with a plurality of quantities of like physical objects from the plurality of remote systems;
generate an expected quantity value of the like physical objects at a facility associated with a first one of the plurality of remote systems;
determine that the expected quantity value of the like physical objects at the facility is less than a threshold amount;
communicate first instructions, in response to the determination that the expected quantity value of the like physical objects at the facility is less than a threshold amount, controlling at least a first image capturing device at the facility to capture an image of a vacant space at a designated location at which the like physical objects are supposed to be disposed;
receive the image and extract physical attributes of the vacant space based on the image;
query a database to retrieve attributes associated with the like physical objects;
determine a set of like replacement physical objects, based on the physical attributes of the vacant space and the attributes associated with the like physical object, to be placed into the vacant space; and
transmit second instructions controlling depositing at least some of the set of like replacement physical objects at the designated location of the like physical objects;
wherein the central computing system is further configured to:
communicate the second instructions to a first robot device, of a plurality of autonomous robot devices, controlling the first robot device to travel to the designated location and capture the image corresponding to the vacant space.

11. The system of claim 1, wherein the transmitting the first instructions comprises transmitting a retrieve instruction controlling the at least one autonomous robot device, the retrieve instruction comprising a specified quantity, and directing the at least one autonomous robot device to retrieve the specified quantity of the replacement physical objects from a location of the like replacement physical object in the facility.

12. A physical object replacement method, the method comprising:
- receiving, at a central computing system operatively coupled to a plurality of remote systems, data associated with a plurality of quantities of like physical objects from the plurality of remote systems;
- generating, via the central computing system, an expected quantity value of the like physical objects at a facility associated with a first one of the plurality of remote systems;
- determining, via the central computing system, that the expected quantity value of the like physical objects at the facility is less than a threshold amount;
- communicating image instructions, via the central computing system and in response to the determination that the expected quantity value of the like physical objects at the facility is less than a threshold amount, controlling at least a first image capturing device at the facility to capture an image of a vacant space at a designated location at which the like physical objects are supposed to be disposed;
- receiving, via the central computing system, the image and extract physical attributes of the vacant space based on the image;
- querying, via the central computing system, a database to retrieve attributes associated with the like physical objects;
- determining, via the central computing system, a set of like replacement physical objects based on the physical attributes of the vacant space and the attributes associated with the like physical objects to be placed in to the vacant space; and
- transmitting deposit instructions controlling depositing at least some of the set of like replacement physical objects at the designated location of the like physical objects;
- wherein the transmitting the deposit instructions comprises transmitting at least a robot instruction to at least one autonomous robot device of a plurality of autonomous robot devices disposed in the facility, wherein the plurality of autonomous robot devices are in selective communication with the central computing system.

13. The method of claim 12, wherein the communicating instructions controlling the first image capturing device comprises causing activation of the first image capturing device proximate the designated location to capture the image of the vacant space at the designated location, wherein the first image capturing device is one of a plurality of image capturing devices disposed in the facility and each of the plurality of image capturing devices is in selective communication with the central computing system.

14. The method of claim 12, further comprising:
- determining, via the central computing system, a quantity of the set of like physical objects designated to be disposed at the designated location and that are expected absent from the facility based on data corresponding to quantities of physical objects associated with the first one of the plurality of remote systems; and
- retrieving, via the central computing system and from a physical objects database, identification information of the like physical objects of the set of like physical objects, and the designated location of the set of like physical objects in the facility.

15. The method of claim 14, further comprising:
- accessing, via the central computing system, rules associated with the designated location and physical objects disposed in the facility associated with the first one of the plurality of remote systems; and
- wherein the determining the set of like replacement physical objects comprises determining the set of like replacement physical objects based on the physical attributes of the vacant space, the attributes associated with the like physical objects to be placed in to the vacant space, and the rules.

16. The method of claim 12, further comprising:
- ranking, via the central computing system, each different like replacement physical objects of a plurality of different like replacement physical objects; and
- selecting the set of like replacement physical objects from the plurality of different like replacement physical objects to be placed into the vacant space.

17. The method of claim 12, further comprising generating, via the central computing system, a replaceability score for each of the like replacement physical objects of the set of like replacement physical objects based on a calculated probability that the like physical objects are replaceable by a respective like replacement physical object of the set of like replacement physical objects, based on the physical attributes of the vacant space and the attributes associated with the like physical object.

18. The method of claim 17, further comprising ranking each of the respective like replacement physical objects of the set of like replacement physical objects based on the replaceability score for each of the respective like replacement physical objects of the set of like replacement physical objects.

19. The method of claim 12, further comprising:
- accessing, via the central computing system, remote databases each associated with a respective one of the plurality of remote systems; and
- retrieving, from the remote databases, a respective quantity data identifying a designated quantity of the like physical objects associated with the respective one of the plurality of remote systems.

* * * * *